(12) United States Patent
Phillips et al.

(10) Patent No.: US 9,758,316 B2
(45) Date of Patent: Sep. 12, 2017

(54) METHOD AND SYSTEM FOR INCREASING THE AGGREGATE PRODUCTION OF FOOD PACKAGING OPERATIONS

(71) Applicant: YTA HOLDINGS, LLC, Los Angeles, CA (US)

(72) Inventors: Jonathan R. Phillips, San Juan Capistrano, CA (US); Richard C. Blackburn, Santa Ana, CA (US)

(73) Assignee: YTA HOLDINGS, LLC, Los Angeles, CA (US)

( * ) Notice: Subject to any disclaimer, the term of this patent is extended or adjusted under 35 U.S.C. 154(b) by 0 days.

(21) Appl. No.: 15/006,093

(22) Filed: Jan. 25, 2016

(65) Prior Publication Data

US 2016/0214744 A1 Jul. 28, 2016

Related U.S. Application Data

(60) Provisional application No. 62/107,395, filed on Jan. 24, 2015.

(51) Int. Cl.
| | |
|---|---|
| *B65G 47/69* | (2006.01) |
| *B65G 47/51* | (2006.01) |
| *B65B 23/06* | (2006.01) |
| *A01K 43/04* | (2006.01) |
| *B65G 49/05* | (2006.01) |

(52) U.S. Cl.
CPC .......... *B65G 47/5118* (2013.01); *A01K 43/04* (2013.01); *B65B 23/06* (2013.01); *B65G 47/69* (2013.01); *B65G 49/05* (2013.01)

(58) Field of Classification Search
CPC ........ B65B 23/06; A01K 43/00; A01K 43/04; B65G 49/05; B65G 47/5118; B65G 47/69
See application file for complete search history.

(56) References Cited

U.S. PATENT DOCUMENTS

| 3,342,012 A | * | 9/1967 | Reading ................ | A01K 43/00 198/384 |
| 3,792,768 A | * | 2/1974 | Cheeseman ............ | B65B 23/06 198/445 |
| 3,948,765 A | * | 4/1976 | Anschutz ............... | A01K 43/00 209/513 |
| 4,356,920 A | * | 11/1982 | van der Schoot ..... | A01K 43/00 209/513 |
| 4,413,724 A | * | 11/1983 | Fellner .................. | B65G 1/133 198/594 |
| 4,509,634 A | * | 4/1985 | Payne ..................... | A24C 5/35 198/347.3 |
| 4,811,551 A | * | 3/1989 | Nambu .................. | A01K 43/00 53/155 |
| 5,167,317 A | * | 12/1992 | van der Schoot ..... | A01K 43/00 198/469.1 |
| 5,232,080 A | * | 8/1993 | van Essen ............. | B65B 23/06 198/418.6 |
| 5,884,750 A | * | 3/1999 | van Veldhuisen ...... | B65B 23/06 198/377.02 |

(Continued)

*Primary Examiner* — Thomas Randazzo
(74) *Attorney, Agent, or Firm* — Hankin Patent Law, APC; Susan Mizer; Anooj Patel

(57) ABSTRACT

The present disclosure includes a system and method for providing a reservoir conveyor that provides the linear space needed to increase the capacity of the buffer storage reservoir such that it is compatible with and increases the efficiency of a Grader and packers.

15 Claims, 7 Drawing Sheets

(56) References Cited

U.S. PATENT DOCUMENTS 6,168,005 B1 * 1/2001 Petrovic ............ B65G 47/5118
198/347.4
6,625,960 B1 * 9/2003 Nambu ................ B65B 23/06
198/523

* cited by examiner

METHOD AND SYSTEM FOR INCREASING THE AGGREGATE PRODUCTION OF FOOD PACKAGING OPERATIONS

CROSS-REFERENCE TO RELATED APPLICATION

This application claims the benefit of U.S. Provisional Application No. 62/107,395 filed on Jan. 24, 2015, the contents of which are incorporated herein by reference in its entirety.

BACKGROUND

Field of the Invention

The disclosure relates generally to the field of food product processing, and more particularly methods and systems for increasing the aggregate production of food packaging operations. While reference is made herein to eggs in particular, it should be understood that this disclosure is directed to all food products that may be sorted and packed through the use of automated machinery.

In the egg packing industry, eggs typically undergo a great deal of processing before they are ready to be sold to the consuming public. In many circumstances, for example, eggs pass through several processing stations where they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc. (U.S. Pat. Nos. 4,189,898; 4,195,736; 4,505,373; 4,519,494; 4,519,505; 4,569,444; 4,750,316; 5,321,491; and 6,056,341) and TEN Media LLC (U.S. Pat. No. 8,455,030), which are incorporated herein by reference in their entirety.

The egg packing industry uses devices known as "packers" to pack the eggs into the packages. Typically, a packer includes a conveyor (e.g., a belt conveyor, roller conveyor, chain conveyor, etc.) that moves empty packages through an egg loading section (where the eggs are loaded into the egg loading section from above) and then moves the filled packages to a package closing section that is responsible for closing the lids of the packages. The eggs may be supplied to the egg packer via a grader system. A single grader system may supply eggs to multiple packers. It is not uncommon for a facility in which these stations operate to output about one million eggs in a single day. Accordingly, to be commercially acceptable, the throughput of the packing stations needs to be quite high, with some packing stations typically processing on the order of 20,000 eggs per hour. Similarly, the throughput of other stations, such as washing stations and graders, must also be high, with some graders and washing stations processing up to 180,000 eggs per hour.

An egg packing process that uses "packers," typically uses bulk belts to bring eggs from a bulk supply location. The eggs are cleaned or disinfected, in some instances using UV light while clamped to transport chains, and in some instances through immersion in sanitizing wash water. The eggs are then inspected either electronically or manually, they are weighed to establish size, inspected for cracks using ultrasonic inspection and loaded into a chain driven carriage mechanism ("Transfer Loader"). The egg is then normally transported to one of a plurality of packing machines by the aforementioned carriage mechanism. The particular packing machine to which any individual egg may be transported is determined by a computer. This process or elements thereof up to, but not including the packing machine, constitute grading ("Grading" and the "Grader"). The carriage mechanism typically consists of one or a plurality of chains, running the length of the Grader past all the packing machines in the horizontal plane ("Grader Chains"). The packing machines are usually configured with an egg flow perpendicular to the Grader Chain in the horizontal plane.

In typical operation, eggs are delivered to the packers using the Grader. The packers typically incorporate a buffer storage reservoir area for unpacked eggs, located above the flow of packages, from which eggs are packed into packages.

It is known in the art that the packer constitutes the slowest portion of the egg sorting, grading, and packing process. If the packer slows or stops operating for any reason, eggs accumulate in the buffer storage reservoir. The buffer storage reservoir has a limited capacity; if the buffer storage reservoir fills to capacity, in some instances the complete egg grading system will be forced to stop, causing lost productivity on all packers. Additionally, when the buffer storage reservoir becomes full, eggs may experience increased contact with other eggs, which can initiate cracks in the eggs.

Commercial limits on the cracks permitted in eggs can cause such eggs to be lost or devalued.

If the reservoir conveyor system can provide increased capacity in the reservoir, it can reduce the likelihood of increased egg contact and of grading system stoppages due to reservoir backup.

As such, there is a need in the art for a system and method to increase the reservoir conveyor system capacity and dynamically manage its contents to improve the efficiency and consistency of the packers and thereby improve aggregate production.

BRIEF SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with the embodiments herein, the present disclosure includes a system and method for providing a reservoir conveyor that provides the linear space needed to increase the capacity of the buffer storage reservoir such that it is compatible with and increases the efficiency of a Grader and packers. Although the disclosed systems and methods are compatible with and increase the efficiency of a Grader and packers incorporating a laser marking system for marking on eggs, the disclosed systems and methods provide benefits to all types of Graders and packers.

In a preferred embodiment, the present disclosure includes a reservoir conveyor positioned relative to the packer such that it may have increased width without increasing the linear space required by the packer. In so doing, the reservoir conveyor and its associated buffer storage reservoir can hold more eggs and thereby allow more packer downtime without reaching capacity. As a result, the Grader for all packers can continue to operate without having to stop to compensate for a packer's downtime or lack of speed.

In an alternate preferred embodiment, the present disclosure includes a reservoir conveyor positioned relative to the packer such that it may have increased length, resulting in greater capacity for eggs. The egg loading section of the packer may then be relocated farther from the egg grading machine. Consequently a longer outfeed accumulating conveyor can be utilized, in turn improving the tolerance of the complete system to temporary disruptions in the offloading process for completed packages of eggs. For example as a consequence of making the reservoir longer, the outfeed accumulating conveyor of the packer, which buffers completed packages of eggs, can be configured to grow commensurately as well. Thus, not only do the extended reservoir systems and methods disclosed herein provide for extended capacity at the infeed portion of the packer, but they also provide extended capacity at the outfeed portion as well. Typically, if packages or cartons fill the outfeed accumulating conveyor and begin to backup close to the packer, the packer must stop processing eggs. As a result, the infeed reservoir, whether extended in linear size or not, may reach maximum capacity, causing the Grader to shut down. Egg processing facilities typically employ sufficient labor to unload the complete cartons so that the outfeed conveyor never backs up into the packer. Having a larger capacity outfeed buffer conveyor, which in some embodiments runs parallel to the infeed buffer conveyor, will increase the number of cartons that can accumulate before the packer must shut down, thus allowing for the optimization of labor.

In accordance with the embodiments herein, the present disclosure includes a reservoir extension that is powered by the packer's pre-existing reservoir drive motor system. In this way no additional motor, gearboxes or other controls are required for the reservoir extension to function as intended.

In accordance with the embodiments herein, the present disclosure includes a reservoir conveyor that is independently powered from the packer and includes a separate motor than that which operates the packer. Such a configuration allows the reservoir conveyor to move eggs from the Grader drop point deeper into the buffer storage reservoir even when the packer conveyor is not running. Thus, the buffer storage reservoir will continue to fill during the packer downtime and allow the Grader to continue to operate and provide eggs to all of the packers.

In accordance with some embodiments, the present disclosure provides that the reservoir conveyor will have a series of short ramps configured to prevent unwanted forward movement of the eggs on the reservoir conveyor, thereby allowing a higher speed of travel by the eggs on the conveyor while mitigating the risk that an egg will be cracked due to a high-speed impact from the egg behind it.

In accordance with some embodiments, the present disclosure provides a reservoir conveyor with six independent tracks that may accommodate existing Grader drop points and simplify the transition to the main packer reservoir.

In accordance with a preferred embodiment, the present disclosure provides a reservoir storage buffer with a non-horizontal configuration, allowing the packer height to be adjusted with respect to the grader system to optimize performance.

In accordance with a preferred embodiment, the present disclosure provides a reservoir conveyor configured as an offset reservoir design that uses the angled motion of eggs to provide for relocation of packers to suit local conditions. Such a design allows for multiple configurations of packers to maximize floor space. This offset design may also allow for a reservoir storage buffer for greater length because it is not limited to the perpendicular space between the Grader and the packer.

In accordance with some embodiments, the present disclosure provides a reservoir conveyor configured to redirect eggs into an auxiliary reservoir storage buffer in the event of extended packer downtime when the primary reservoir storage buffer is becoming full. This helps prevent more extensive packer downtime from negatively impacting Grader performance. In some embodiments the auxiliary reservoir storage buffer may consist of an additional storage reservoir located beneath the grader conveyor and inline and level with, or at a slightly higher elevation than the primary reservoir storage buffer.

In accordance with some embodiments, the present disclosure provides a reservoir conveyor that is computer controlled. In such embodiments, this allows the reservoir conveyor to react to other aspects of the grading and packing process that are being monitored by computer. For instance, the reservoir conveyer may queue a higher or lower number of eggs, may move eggs more quickly through the reservoir storage buffer, and/or deposit eggs in auxiliary reservoir storage buffers depending on a variety of quality control metrics, including packer performance, performance of other packers, lasing quality on eggs, and any other metric known in the art. In the event a quality control event indicates that manual retrieval and inspection of eggs may be necessary due to, for instance, a known *salmonella* outbreak, or excessive proportions of cracked eggs at the grader drop point, the reservoir conveyor may be programmed to divert all eggs into one or more auxiliary reservoir storage buffers.

In the above embodiments as well as those that would be envisioned by one skilled in the art based on the present disclosure, the reservoir conveyor improves aggregate food production by reducing the inefficiency of and improving the consistency of the packer. The reservoir conveyor does so by, for example, always ensuring there is an adequate and/or optimum supply of eggs for the packer while minimizing the impact that any one packer's speed has on the overall Grader performance and thus the performance of the remaining packers.

In some embodiments of the present disclosure, the belt conveyor can include a flip-up tail, which would allow ready access to the underside of the conveyor belt and associated support mechanisms. Such a configuration would allow for, among other things, easy cleanup of broken eggs and other debris.

In some embodiments of the present disclosure, quick-disconnect or drop-in components may be used for the guide rails on the conveyor and for the side rails of the conveyor. Such components can be removed easily for more thorough cleaning offline, and they may also permit generally more ready access to the conveyor belt and associated mechanisms. Both these rail components and the belt conveyor including a flip-up tail are compatible with each other and may be included in the same embodiment.

Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious aspects all without departing from the scope herein. Accordingly, the drawings and descriptions will be regarded as illustrative in nature and not as restrictive.

BRIEF DESCRIPTION OF THE DRAWINGS

The accompanying drawings incorporated herein and forming a part of the specification illustrate the example embodiments.

DETAILED DESCRIPTION OF THE PREFERRED EMBODIMENTS

Figure 1:
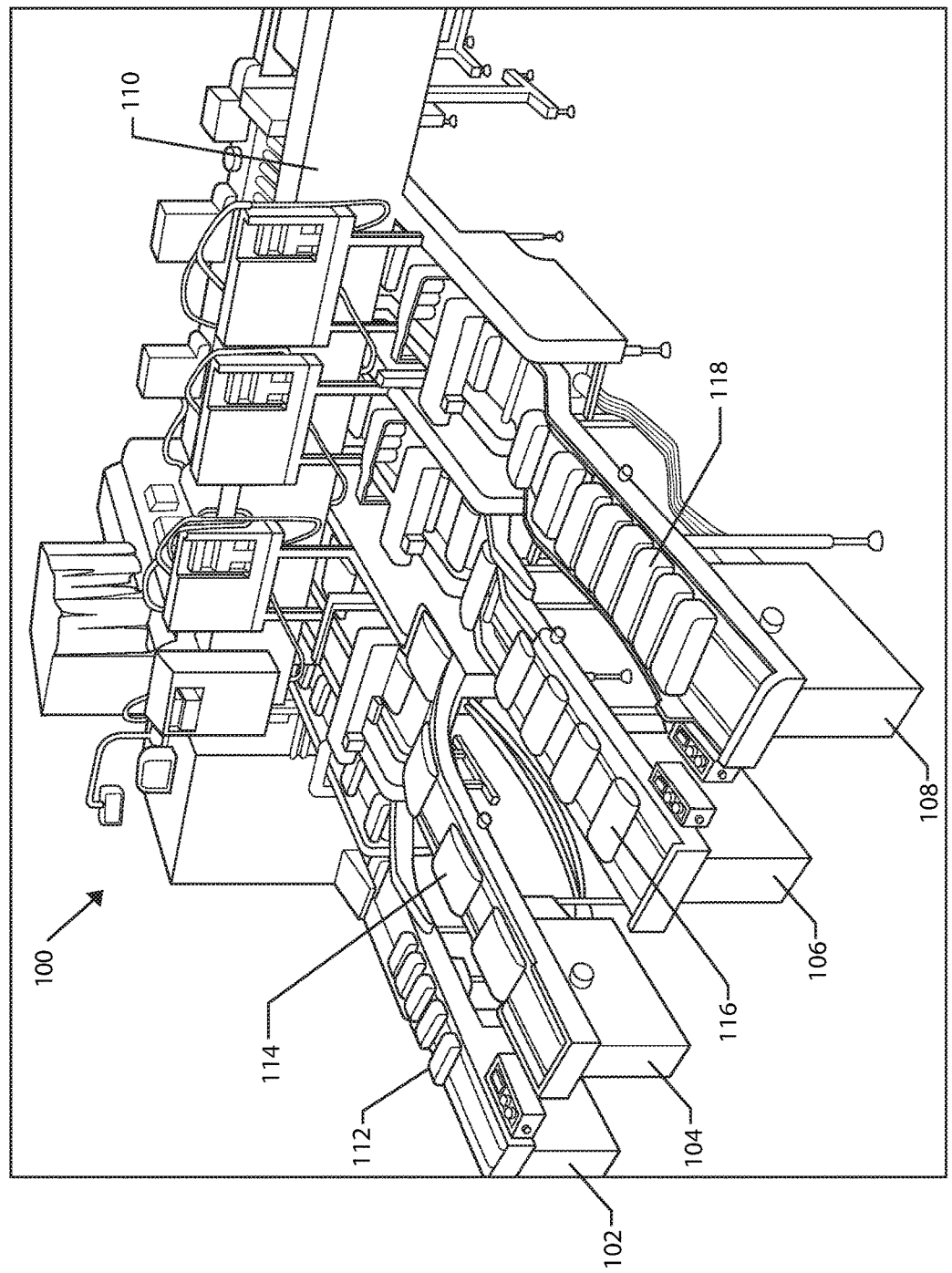
FIG. 1 is an example of a known egg packing system.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide methods and systems for increasing the aggregate production of food packaging operations. Embodiments of the present disclosure are directed to an apparatus as well as a method for increasing the capacity of a buffer storage reservoir. The reservoir may have a length large enough to increase the size of the buffer storage reservoir within the reservoir conveyor. While reference is made herein to eggs in particular, it should be understood that this disclosure is directed to all food products that may be sorted and subsequently packed via a conveyor-based system.

Figure 2:
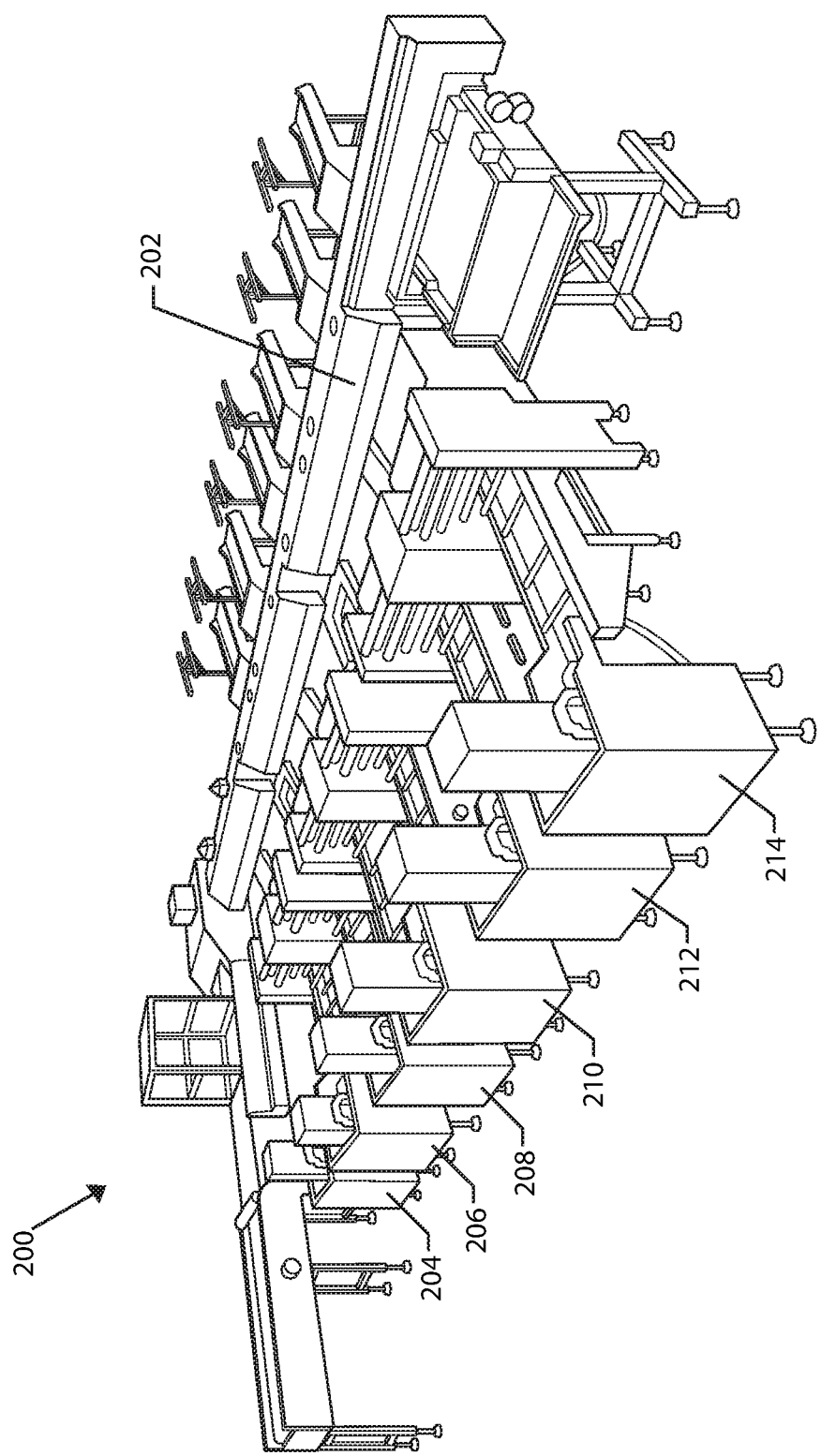
FIG. 2 is an example of another known egg packing system.

Referring to FIG. 1, an egg packing system 100 is shown having a plurality of packers 102, 104, 106 and 108 and a grader system 110 that passes the eggs to the packers which pack the eggs into packages 112, 114, 116, and 118. Similarly, FIG. 2 shows another egg packing system 200 that includes a grader system 202, a plurality of packers 204, 206, 208, 210, 212, and 214.

Figure 3A:
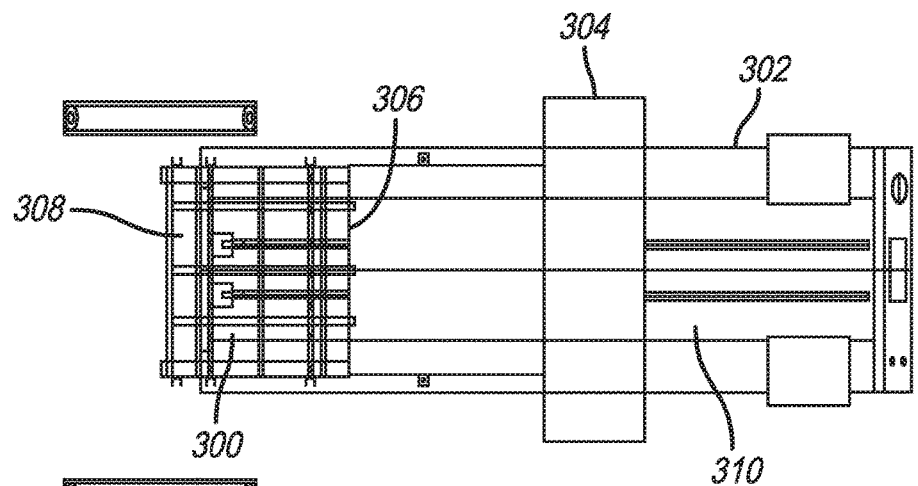
FIG. 3A is a top-view of a system diagram of an example of an implementation of a reservoir conveyor shown on a packer in accordance with the present disclosure.
Figure 3B:
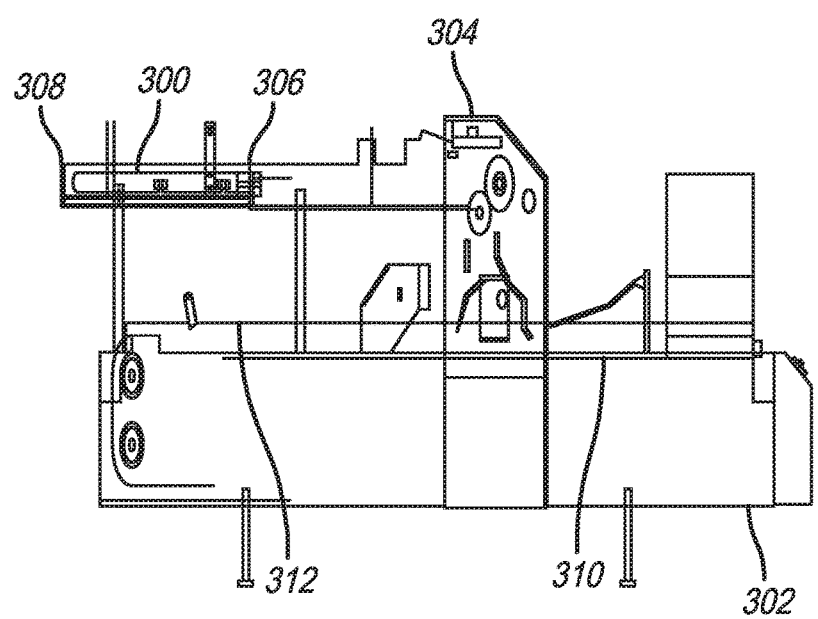
FIG. 3B is a side-view of a system diagram of the example of the implementation of the reservoir conveyor shown on the packer shown in FIG. 3A in accordance with the present disclosure.

Turning to FIG. 3A, a top-view of a system diagram of an example of an implementation of the extended reservoir conveyor 300 is shown on a packer 302 in accordance with the present disclosure. FIG. 3B is a side-view of the system diagram of the example of the implementation of the extended reservoir conveyor 300 shown on the packer 302 in accordance with the present disclosure. The reservoir conveyor 300 is connected to an egg loading section 304 of the packer 302 at first end 306 and an egg grader (not shown) at second end 308. In an example of operation, eggs are passed from the egg grader (not shown) to the reservoir conveyor 300 via the second end 308. The reservoir conveyor 300 then passes the eggs along the conveyor to the first end 306 and then to the egg loading section 304. The egg loading section 304 then receives an egg package (not shown) along a conveyor 310 and then deposit a plurality of eggs into the egg package. The egg package may be an egg carton that is passed from the egg loading section 304 to an package closing area 312, where the packaging is closed and the closed package is passed to an output section (not shown) of the packer 302. The time that it takes for an egg to travel from the second end 308 to the first end 306 is directly proportional to the buffer time of the reservoir conveyor 300. In this example, the reservoir conveyor 300 may be configured to reduce the floor-space requirements for an egg marking system (not shown) that may be configured on the packer 302. The egg marking system may be a lasing system. It is appreciated that the additional length of the reservoir conveyor 300 may increase the reservoir capacity, which may result in reducing the number of breakage of eggs during movement along the path from the grader system to the egg loading section 304. This may allow for more packer downtime before the number of eggs backs up into the grader system and forces lost time on the grader system.

The reservoir conveyor 300 may utilize an independently powered design that is independent from the packer 302 that includes a separate motor. In this example, the reservoir conveyor 300 may allow the eggs to be pulled away from the grader system drop point even when the packer 302 is in breakdown and the packer reservoir belt is not running. Additionally, the reservoir conveyor 300 may remove eggs from the drop location when the speed of next egg is at a maximum. As another example, the reservoir conveyor 300 may include an independent power source with short ramps made of metal configured to prevent runaway down the slope of the short ramps and thereby reduce checks and cracks due to high-speed impact of the egg following the one before it. Alternatively, the reservoir conveyor 300 may utilize the power from the packer 302 saving capital, energy, and complexity.

In some embodiments, the reservoir conveyor 300 may have one or more additional parallel reservoir storage buffer layers (not shown) below the layer into which the Grader deposits the eggs. These additional buffer layers may include their own reservoir conveyors (not shown), which may be accessed through hinged ramps, adjustments to the main conveyor angle, or any other means suitable in the art. This allows for the additional storage of eggs if the associated packer experiences extended downtime, thus preventing the need for Grader downtime. These eggs may be retrieved manually, or the conveyor may be configured to reverse the flow of eggs back into the main buffer by any suitable means known in the art.

As a further example, the reservoir conveyor 300 may include six independent tracks that may accommodate existing grader drop points and simplify the transition to the main packer reservoir.

Figure 3C:
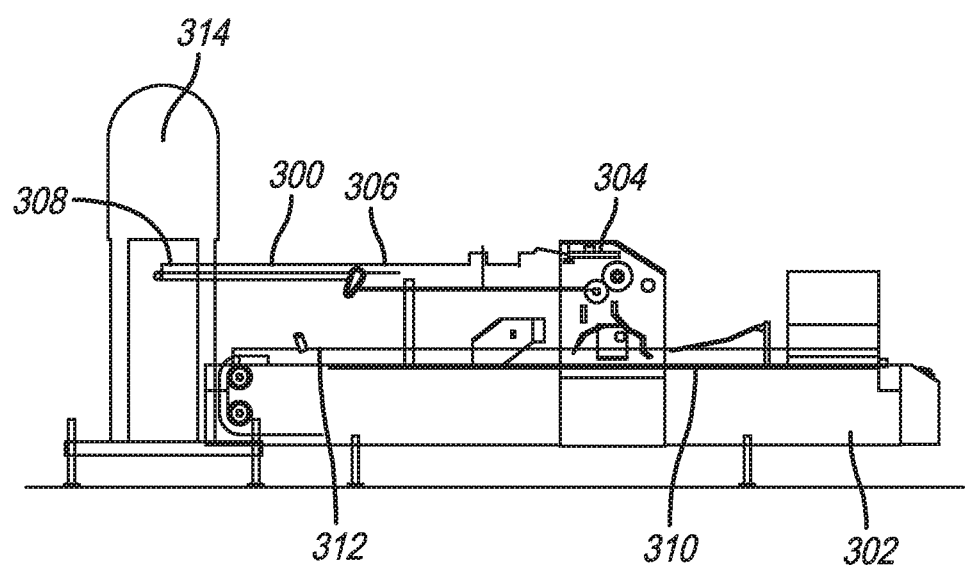
FIG. 3C is a side-view of a system diagram of the example of the implementation of the reservoir conveyor shown on the packer shown in FIG. 3A with the implementation of a Slimline design in accordance with the present disclosure.

Referring to FIG. 3C, in some embodiments of the present disclosure, the system and methods may be implemented with Slimline designs 314 may be configured to minimize or decrease the impact on the grader system or the packer and egg marking system below. In another example, AC motor power to reservoir conveyor 300 may be provided under packer control, the Grader control, or any other suitable control of the system so as to allow the reservoir conveyor 300 to be turned off when grader system is down. Alternatively, a manual switching and/or power disconnect may be used.

Figure 3D:
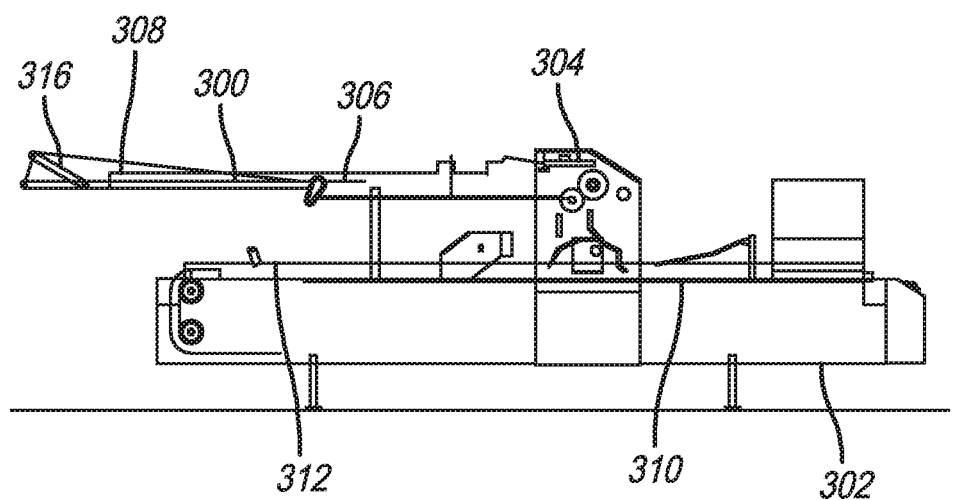
FIG. 3D is a side-view of a system diagram of the example of the implementation of the reservoir conveyor shown on the packer shown in FIG. 3A with the implementation of a flip-up portion of the reservoir conveyor in accordance with the present disclosure.

Referring to FIG. 3D, in another embodiment of the present disclosure, the reservoir conveyor 300 may include utilizing systems that can be readily cleaned with quick-removable lane guides, side guides, and flip-up conveyor end 316. The reservoir conveyor 300 is connected to an egg loading section 304 of the packer 302 at first end 306 and an egg grader (not shown) at second end 308 as discussed in detail above. The egg loading section 304 receives an egg package (not shown) along a conveyor 310 and then deposits a plurality of eggs into the package, wherein the egg package is passed to a package closing area 312 for closing.

A non-horizontal configuration is possible, allowing the packer height to be adjusted with respect to the grader system, this may optimize the performance of the egg packing system design. In some embodiments, the reservoir conveyor 300 may be sloped so as to add additional length without having to increase the horizontal footprint of the reservoir conveyor 300.

Figure 4A:
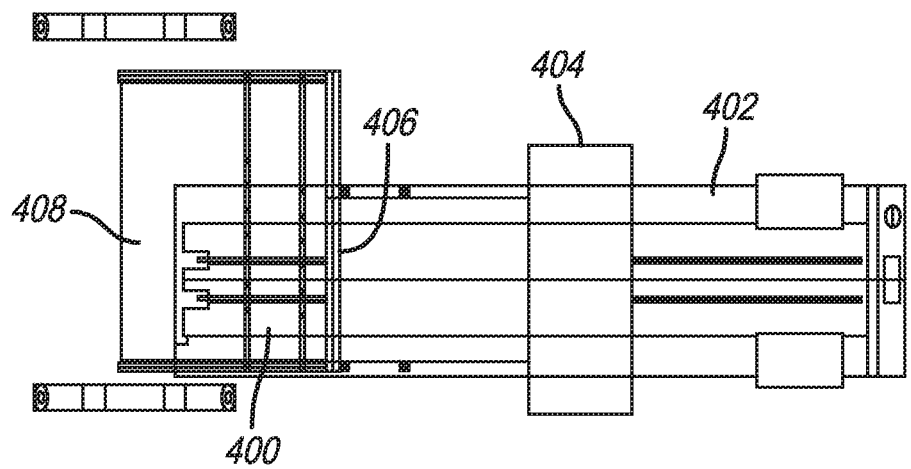
FIG. 4A is a top-view of a system diagram of another example of an implementation of a reservoir conveyor shown on a packer in accordance with the present disclosure.
Figure 4B:
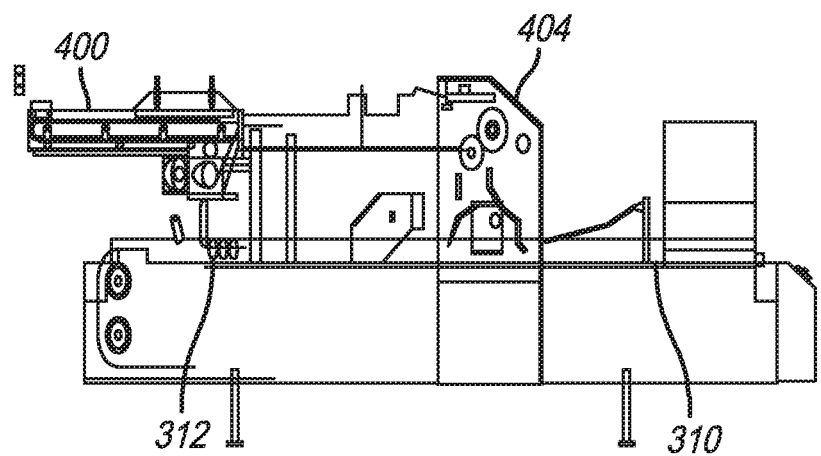
FIG. 4B is a side-view of a system diagram of the example of the implementation of the reservoir conveyor shown on the packer in FIG. 4A in accordance with the present disclosure.

Turning to FIG. 4A, a top-view of a system diagram of an example of an implementation of another reservoir conveyor 400 is shown on a packer 402 in accordance with the present disclosure. FIG. 4B is a side-view of the system diagram of the example of the implementation of the reservoir conveyor 400 shown on the packer 402 in accordance with the present disclosure. Similar to packer 302 shown in FIGS. 3A and 3B, the reservoir conveyor 400 is connected to an egg loading section 404 of the packer 402 at first end 406 and an egg grader (not shown) at second end 408. In an example of operation, eggs are passed from the egg grader (not shown) to the reservoir conveyor 400 via the second end 408. The reservoir conveyor 400 then passes the eggs along the conveyor to the first end 306 and then to the egg loading section 404. The egg loading section 404 then receives an egg package (not shown) along a conveyor 310 and then deposits a plurality of eggs into the egg package. The egg package may be an egg carton that is passed from the egg loading section 404 to an package closing area 312, where the packaging is closed and the closed package is passed to an output section (not shown) of the packer 402. The time that it takes for an egg to travel from the second end 408 to the first end 406 is directly proportional to the buffer time of the reservoir conveyor 400. Unlike the example in FIGS. 3A and 3B, the reservoir conveyor 400 is configured as an offset reservoir design that uses the angled motion of eggs to provide for re-location of packers to suit local conditions. This also allows for the optimization of packer configurations so as to maximize the number of packers that can fit within a specific footprint.

In some embodiments, the bed of the reservoir conveyor 300 (or 400) may be configured so as to provide additional localized vertical compliance at the Second End 308 where the eggs are dropped from the Grader into the Reservoir. The additional compliance ('give' or 'springiness') reduces the force and impact on the eggs as they transition from the vertical drop from the grader into the horizontal motion of the reservoir conveyor. This compliance can be achieved using holes cut into the conveyor bed at each of the drop points of the eggs from the grader. The holes are suitably sized so that the structural strength of the conveyor bed is not compromised in any way.

Figure 5A:
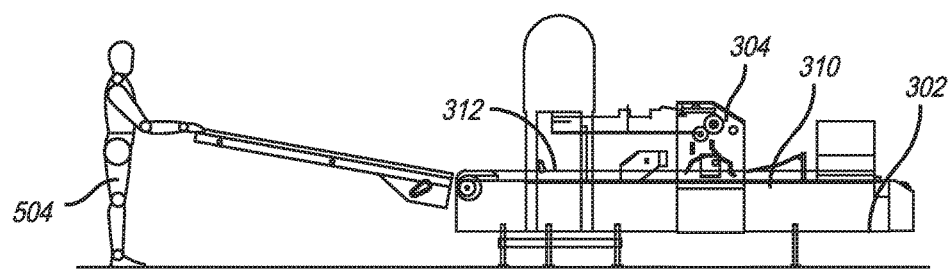
FIGS. 5A and 5B are side-views of system diagrams of examples of the implementation of the reservoir conveyor shown on the packer in FIG. 3A with the additional implementation of an outfeed reservoir conveyor in accordance with the present disclosure.
Figure 5B:
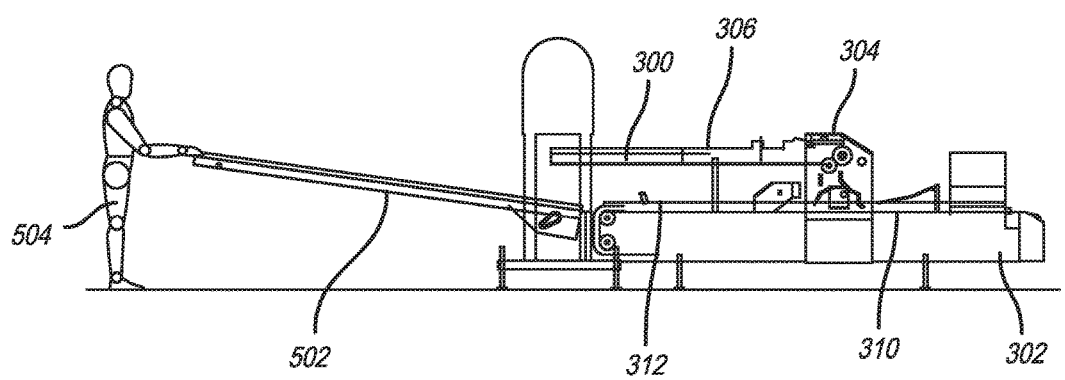

Referring to FIGS. 5A and 5B, are side views of a system diagram of a two example implementations of an outfeed reservoir buffer conveyor 502. As discussed above, a longer outfeed accumulating conveyor can be utilized, in turn improving the tolerance of the complete system to temporary disruptions in the offloading process for completed packages of eggs. For example, as a consequence of making the reservoir longer, the outfeed accumulating conveyor of the packer, which buffers completed packages of eggs, can be configured to grow commensurately as well. Thus, not only do the extended reservoir systems and methods disclosed herein provide for extending capacity at the infeed portion of the packer, but they also provide extended capacity at the outfeed portion as well. Typically, if packages or cartons fill the outfeed accumulating conveyor and begin to backup close to the packer, the packer must stop processing eggs. As a result, the infeed reservoir, whether extended in linear size or not, may reach maximum capacity causing the Grader to shut down. Egg processing facilities typically employ sufficient labor 504 to unload the complete cartons so that the outfeed conveyor never backs up into the packer. Having a larger capacity outfeed buffer conveyor 502, which in some embodiments runs parallel to the infeed buffer conveyor, will increase the number of cartons that can accumulate before the packer must shut down, thus allowing for the optimization of labor.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The invention claimed is:

1. A reservoir conveyor system for transporting objects along at least one path through a processing system, wherein the processing system includes an object grading component and at least one object packaging component, wherein the object grading component includes an outfeed for outputting objects processed by the object grading component and the at least one object packaging component includes an infeed for receiving objects to be packaged thereby, the reservoir conveyor system comprising:

at least one pre-packaged object conveyor component for transporting objects disposed thereon along a path from the object grading component to at least one object packaging component;

wherein the at least one pre-packaged object conveyor component includes a first end and a second end, and a buffer portion positioned therebetween;

wherein the first end is positioned relative to the outfeed of the object grading component for receiving objects processed thereby and the second end is positioned relative to the infeed of the at least one object packaging component;

wherein the at least one pre-packaged object conveyor component is configured to receive objects from the outfeed of the object grading component at the first end and transport the received objects along a path through the buffer portion to the second end to the infeed of the at least one object packaging component;

wherein the buffer portion includes a primary buffer portion and one or more auxiliary buffer portions positioned proximate to the primary buffer portion, wherein the one or more auxiliary buffer portions are configured such that at least a portion of the objects to be transported from the first end of the at least one pre-packaged object conveyor component through the buffer portion to the second end may be diverted to the one or more auxiliary buffer portions; and wherein the buffer portion is of a size and dimension to accommodate objects output from the object grading component for a select period of time at a rate that is greater than a rate at which objects are input into the at least one object packaging component.

2. The reservoir conveyor system of claim 1, wherein the object grading component is an egg grading component and the object packaging component is an egg packaging component.

3. The reservoir conveyor system of claim 1, wherein the at least one pre-packaged object conveyor component further comprises a series of short ramps along a path from the object grading component to the at least one object packaging component for preventing unwanted forward movement of objects thereon.

4. The reservoir conveyor system of claim 1, wherein the at least one pre-packaged object conveyor component is configured at an offset angle wherein objects are transported thereon at an angle.

5. The reservoir conveyor system of claim 1, wherein the one or more auxiliary buffer portions are positioned at least one of above, below, or to the side of the primary buffer portion.

6. The reservoir conveyor system of claim 1, wherein the object packaging component includes an outfeed for outputting packaged objects processed by the at least one object packaging component and the packaging offloading component includes an infeed for receiving packaged objects for offloading, the reservoir conveyor system further comprising:

at least one packaged object conveyor component for transporting objects disposed thereon along a path from the at least one object packaging component and a packaging offloading component;

wherein the object packaging component includes an outfeed for outputting packaged objects processed by the at least one object packaging component and the packaging offloading component includes an infeed for receiving packaged objects for offloading;

wherein the at least one pre-packaged object conveyor component includes a first end and a second end, and a buffer portion positioned therebetween;

wherein the first end is positioned relative to the outfeed of the at least one object packaging component for receiving packaged objects processed thereby and the second end is positioned relative to the infeed of the packaging offloading component;

wherein the at least one packaged object conveyor component is configured to receive packaged objects from the outfeed of the object packaging component at the first end and transport the packaged objects along a path through the buffer portion to the second end to the infeed of the packaging offloading component; and wherein the buffer portion is of a size and dimension to accommodate packaged objects output from the object packaging component for a select period of time at a rate that is greater than a rate at which packaged objects are input into the packaging offloading component.

7. The reservoir conveyor system of claim 1, wherein the reservoir conveyor system includes an associated drive motor component operable to drive the at least one pre-packaged object conveyor component for transporting the objects along a path from the object grading component to at least one object packaging component.

8. The reservoir conveyor system of claim 7, wherein the reservoir conveyor system includes a power component operable to power the drive motor component.

9. The reservoir conveyor system of claim 7, wherein the drive motor component is powered by a power component of the at least one object packaging component.

10. A reservoir conveyor system for transporting objects along at least one path through a processing system, wherein the processing system includes at least one object packaging component and a packaging offloading component, wherein the object packaging component includes an outfeed for outputting packaged objects processed by the at least one object packaging component and the packaging offloading component includes an infeed for receiving packaged objects for offloading, the reservoir conveyor system comprising:

at least one packaged object conveyor component for transporting objects disposed thereon along a path from the at least one object packaging component and a packaging offloading component;

wherein the at least one pre-packaged object conveyor component includes a first end and a second end, and a buffer portion positioned therebetween;

wherein the first end is positioned relative to the outfeed of the at least one object packaging component for receiving packaged objects processed thereby and the second end is positioned relative to the infeed of the packaging offloading component;

wherein the at least one packaged object conveyor component is configured to receive packaged objects from the outfeed of the object packaging component at the first end and transport the packaged objects along a path through the buffer portion to the second end to the infeed of the packaging offloading component;

wherein the buffer portion includes a primary buffer portion and one or more auxiliary buffer portions positioned proximate to the primary buffer portion, wherein the one or more auxiliary buffer portions are configured such that at least a portion of the packaged objects to be transported from the first end of the at least one packaged object conveyor component through the buffer portion to the second end may be diverted to the one or more auxiliary buffer portions; and wherein the buffer portion is of a size and dimension to accommodate packaged objects output from the object packaging component for a select period of time at a rate that is greater than a rate at which packaged objects are input into the packaging offloading component.

11. The reservoir conveyor system of claim 10, wherein the object packaging component is an egg packaging component.

12. The reservoir conveyor system of claim 10, wherein the one or more auxiliary buffer portions are positioned at least one of above, below, or to the side of the primary buffer portion.

13. The reservoir conveyor system of claim 10, wherein the reservoir conveyor system includes an associated drive motor component operable to drive the at least one packaged object conveyor component for transporting the objects along a path from the at least one object packaging component to the packaging offloading component.

14. The reservoir conveyor system of claim 13, wherein the reservoir conveyor system includes a power component operable to power the drive motor component.

15. The reservoir conveyor system of claim 13, wherein the drive motor component is powered by a power component of the at least one object packaging component.

* * * * *